US008733528B1

(12) United States Patent
Goerend

(10) Patent No.: US 8,733,528 B1
(45) Date of Patent: May 27, 2014

(54) TRANSMISSION WITH CONTINUOUS CLUTCH LUBRICATION

(76) Inventor: David J. Goerend, Saint Lucas, IA (US)

(*) Notice: Subject to any disclaimer, the term of this patent is extended or adjusted under 35 U.S.C. 154(b) by 276 days.

(21) Appl. No.: 13/348,764

(22) Filed: Jan. 12, 2012

Related U.S. Application Data

(60) Provisional application No. 61/432,314, filed on Jan. 13, 2011.

(51) Int. Cl.
*F16D 13/74* (2006.01)
*F16H 57/04* (2010.01)

(52) U.S. Cl.
USPC .................... 192/113.34; 184/6.12; 184/11.1; 74/606 R

(58) Field of Classification Search
CPC . F16D 13/74; F16H 57/0424; F16H 57/0463; F16H 57/0465
USPC ..................................................... 192/113.34
See application file for complete search history.

(56) References Cited

U.S. PATENT DOCUMENTS

| 2,935,889 A * | 5/1960 | Adams et al. ................... 74/467 |
| 4,658,662 A | 4/1987 | Rundle |
| 4,727,759 A | 3/1988 | Yamaoka et al. |
| 5,542,306 A * | 8/1996 | Fernandez ................... 74/15.86 |
| 6,202,814 B1 * | 3/2001 | Braford, Jr. ................ 192/70.12 |
| 2005/0172740 A1 | 8/2005 | Ebihara et al. |

* cited by examiner

*Primary Examiner* — Richard M. Lorence
(74) *Attorney, Agent, or Firm* — McKee, Voorhees & Sease, P.L.C.

(57) ABSTRACT

The casing of an automatic transmission has been modified by providing a hole through a wall of the casing adjacent the PTO port. The PTO port cover plate has also been modified to provide a curved ridge which functions to direct lubricating fluid, which normally collects in the area of the PTO port, to the lubrication hole. The fluid goes through the hole to the interior of the transmission, wherein grounded clutch plates are continuously lubricated, both when the clutch is engaged and disengaged.

17 Claims, 6 Drawing Sheets

TRANSMISSION WITH CONTINUOUS CLUTCH LUBRICATION

CROSS-REFERENCE TO RELATED APPLICATIONS

This application claims priority under 35 U.S.C. §119 to provisional application Ser. No. 61/432,314 filed Jan. 13, 2011, herein incorporated by reference in its entirety.

BACKGROUND OF THE INVENTION

Automatic transmissions have various types of clutches and lubrication systems for the clutches. In a grounding clutch, wherein the clutch plates are grounded to the transmission casing, a lubrication hole is typically provided in the piston or in the clutch drum so that a lubricating fluid, such as oil, is supplied to the clutch plates only when the piston pushes on the clutch to engage the clutch. However, when the clutch is engaged, the plates are pressed together and are not susceptible to lubrication. When the clutch is disengaged, no lubrication is provided to the clutch, when the plates are slightly spaced apart. While it is desirable to maintain the clutch plates in a well-lubricated condition, since the lubricating oil is only applied when the clutch is applied and the plates are compressed, the clutch plates may not be as well lubricated as desired.

Therefore, a primary objective of the present invention is the provision of an improved transmission with a continuously lubricated clutch.

Another objective of the present invention is the provision of a transmission wherein the clutch is lubricated both when engaged and disengaged.

Still another objective of the present invention is an automatic transmission with a grounded clutch wherein lubrication is provided by oil passing through a hole in a wall of the transmission casing or housing adjacent one side or face of the clutch.

Yet another objective of the present invention is the provision of an improved automatic transmission having a passageway to provide continuous lubrication of the clutch.

A further objective of the present invention is the provision of an automatic transmission having a PTO port with an improved cover plate to direct lubricating oil to the clutch.

Still another objective of the present invention is the provision of an improved automatic transmission having an oil bypass hole through the casing adjacent the PTO port and a directional baffle to facilitate continuous lubrication of the clutch during operation of the engine.

Yet another objective of the present invention is the provision of an improved automatic transmission having modifications to improve lubrication of the grounded clutch.

A further objective of the present invention is the provision of a method of continuously lubricating a clutch in a transmission.

These and other objectives will be apparent from the following description of the invention.

SUMMARY OF THE INVENTION

The invention modifies the casing of an automatic transmission to provide continuous lubrication of the grounded clutch, when the clutch is both engaged and disengaged. The improvement comprises a small diameter hole extending through a wall of the casing adjacent the PTO port which directs lubricating fluid, such as oil, which normally collects in the area of the PTO port, and directing the fluid inwardly through the hole to the clutch plates. The PTO cover plate has also been modified to provide a curved ridge or flange on the interior surface so as to direct oil into the collection area the lubrication hole. During operation of the engine, lubricating oil which normally collects in the area adjacent the PTO port is directed to the lubrication hole and supplied through the lubrication hole to the clutch plates in a continuous manner, whether the clutch plates are engaged or disengaged.

DETAILED DESCRIPTION OF THE INVENTION

The present invention is directed towards an improved method and means for continuously lubricating a grounded clutch of an automatic transmission, both while the clutch is engaged and disengaged.

Figure 1:
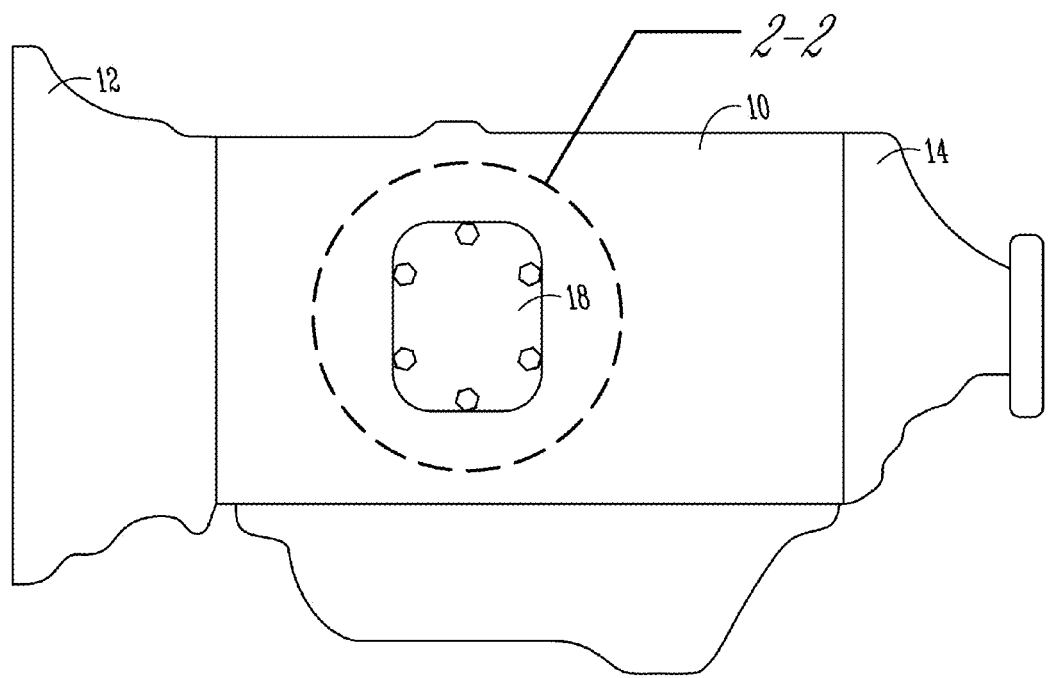
FIG. 1 is a simplified view of an automatic transmission with the improvements of the present invention.

As seen in FIG. 1, the transmission housing or casing is generally designated by the reference numeral 10. The transmission 10 is coupled to a torque converter housing 12 and a rear output housing or cover 14. The transmission housing 10 includes a PTO port 16 which is covered by a plate 18 when the transmission 10 is not coupled to a PTO. The cover plate 18 is mounted to the port 16 with a plurality of bolts 20, as shown in FIG. 6.

Figure 2:
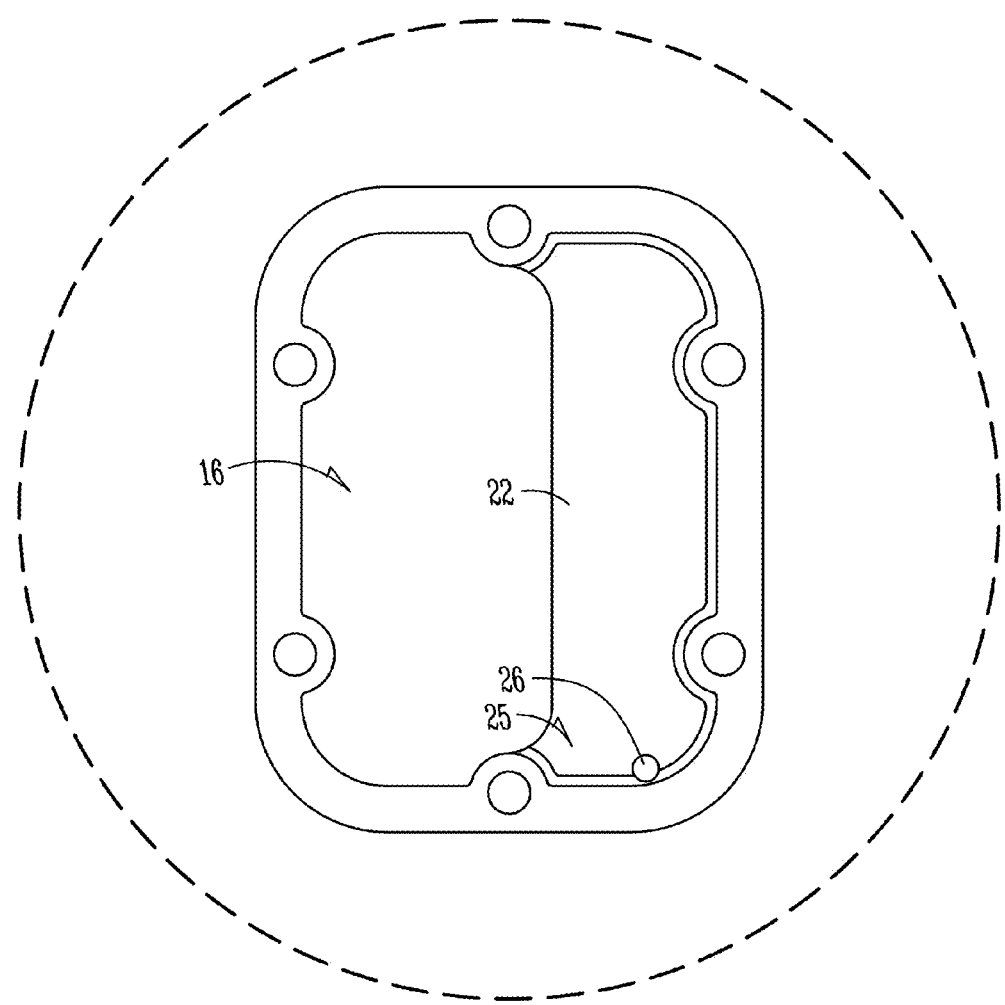
FIG. 2 is an enlarged plan view of the PTO port showing the lubrication hole in the casing internal wall according to the present invention.
Figure 3:
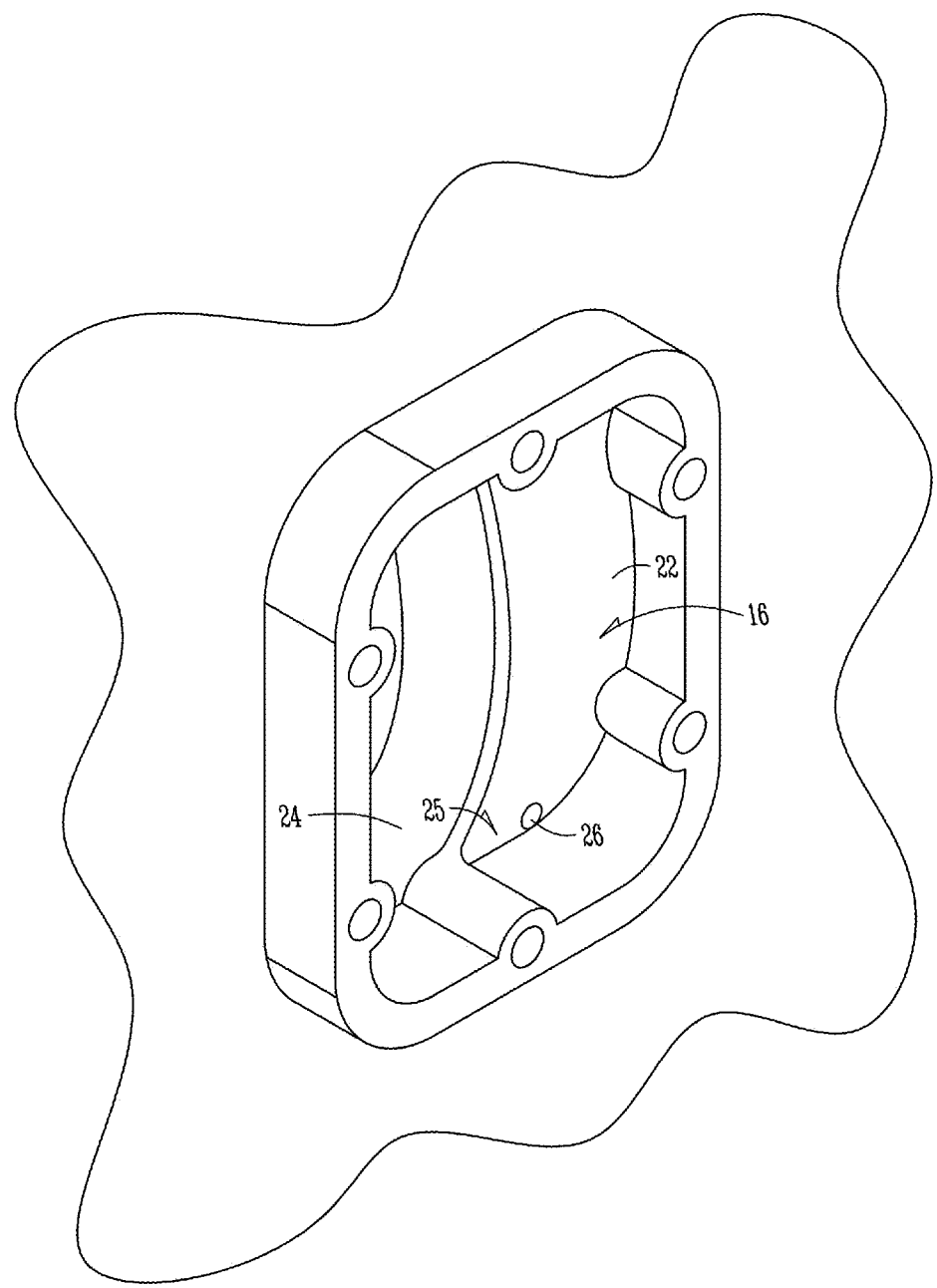
FIG. 3 is a top perspective view of the lubrication hole in the casing wall adjacent the PTO port.
Figure 4:
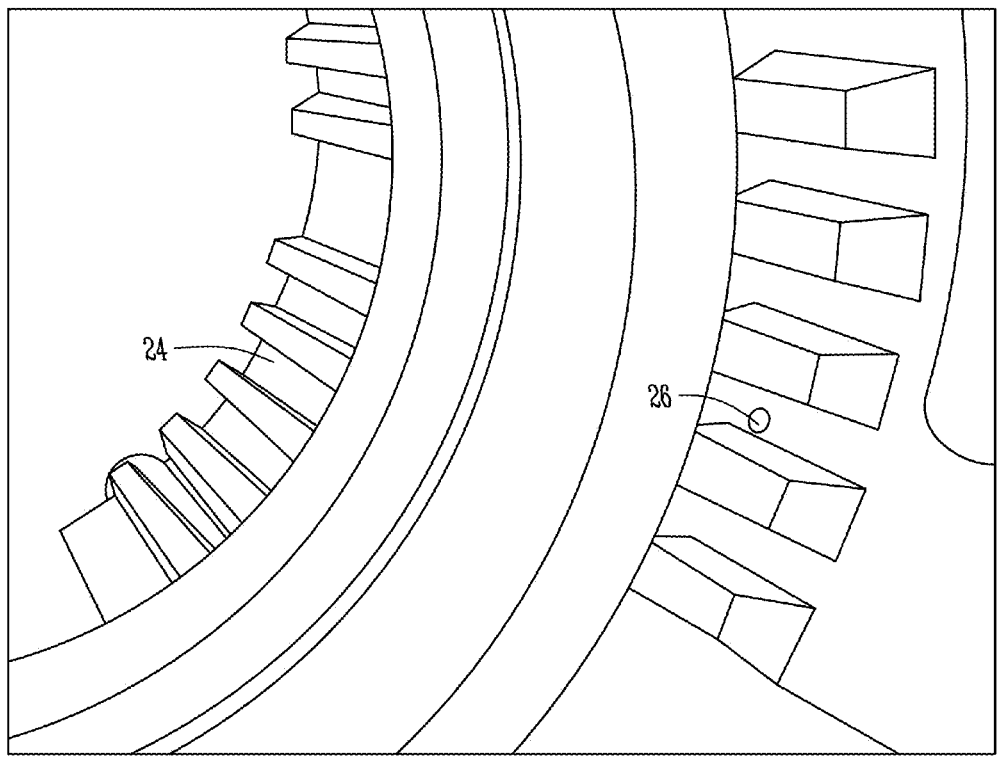
FIG. 4 is an interior perspective view of the transmission and showing the lubrication hole through the transmission casing.
Figure 6:
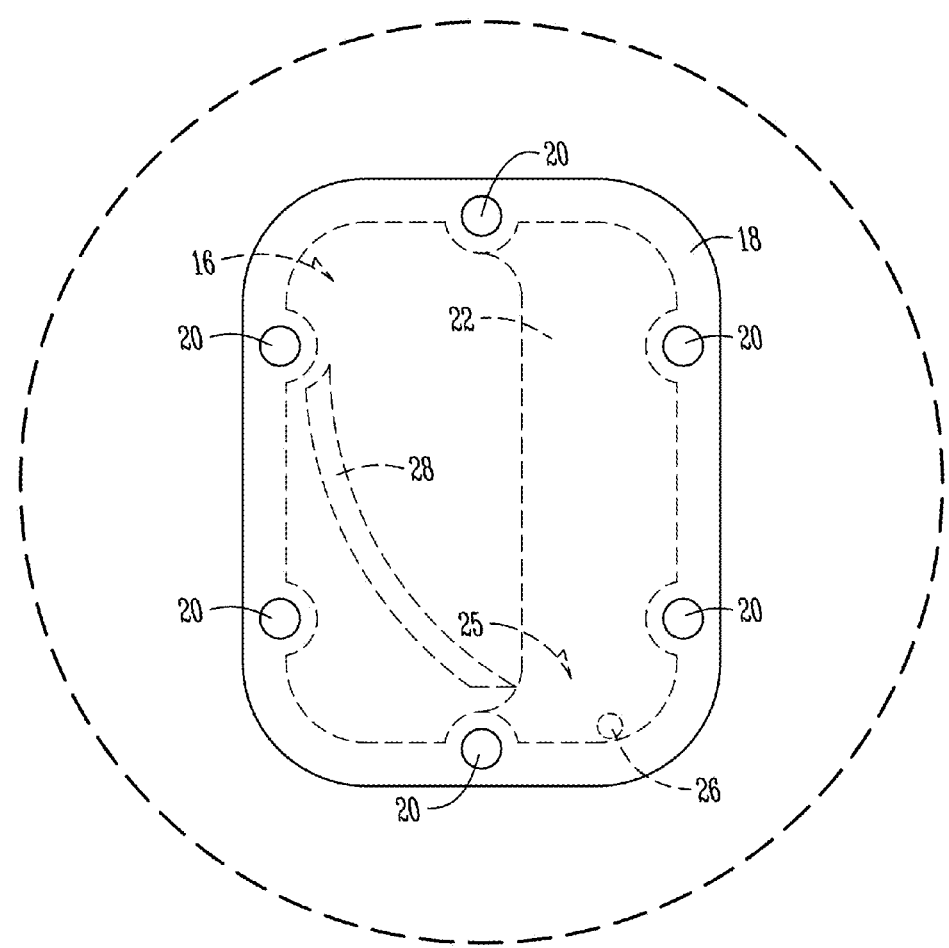
FIG. 6 is an elevation view of the PTO cover plate mounted on the transmission casing according to the present invention.

The transmission casing or housing 10 has an internal wall 22 adjacent the PTO port 16 which partially surrounds the clutch 24, as seen in FIGS. 2, 3 and 6. The internal wall resides adjacent the perimeter edge of the clutch 24 and on one face or side of the clutch 24. A cavity 25 exists between the wall 22 and the cover plate 18, wherein lubricating oil tends to collect or pool in the cavity area 25 of the PTO port 16.

Figure 5:
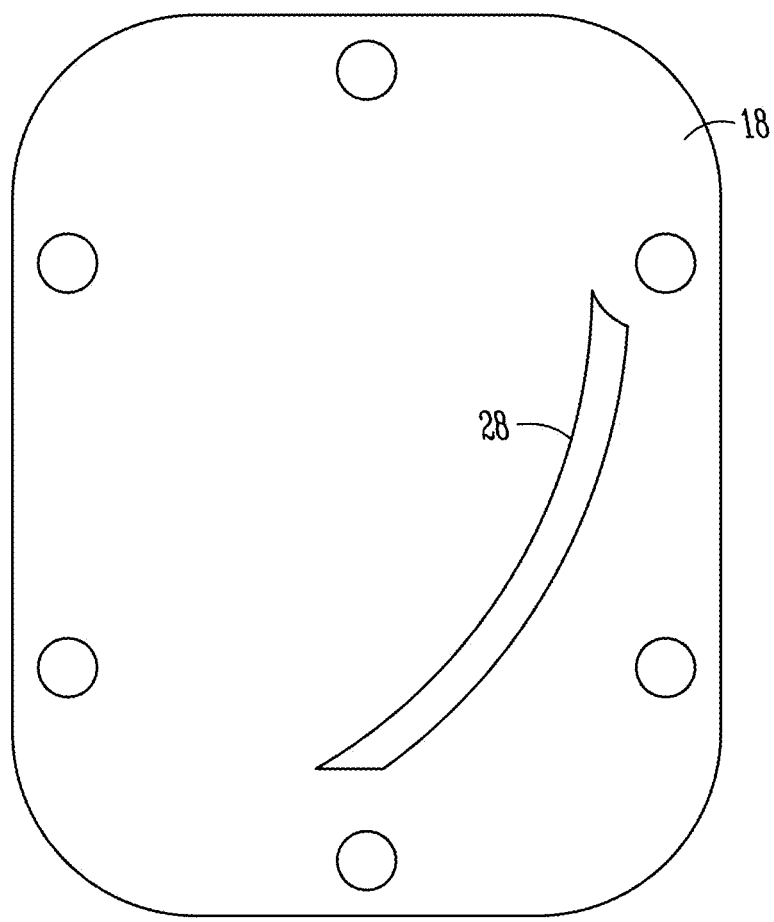
FIG. 5 is a plan view of the inside of the PTO cover plate.

As seen in FIGS. 2-4 and 6, the invention includes a small hole 26 drilled through the internal transmission wall 22 and into the clutch chamber so that oil in the cavity can be supplied to the clutch 24, regardless of whether the clutch is engaged or disengaged. The hole 26 extends through the wall 22 to a point adjacent the perimeter edge of the clutch plates. The invention also modifies the conventional PTO cover by providing a curved ridge or projection 28 formed on the interior of the cover 18 to direct lubricating oil to the new lubricating hole 26, as shown in FIGS. 5 and 6. The ridge 28 on the inside surface of the PTO cover 18 can be formed in any convenient manner, such as casting, a weld bead or a separate structure adhered or otherwise attached or secured to the inside of the cover 18 in any convenient manner.

In operation, lubricating oil which normally collects in the cavity 25 outside the internal wall 22 of the transmission and outside the clutch chamber flows freely through the hole 26 drilled through the internal wall 22 and into the clutch chamber so as to continuously lubricate the clutch 24. Such lubrication occurs when the clutch is engaged and when the clutch is disengaged. The ridge 28 on the cover 18 directs the oil to the hole 26. Thus, the present invention assures that the clutch remains well lubricated at all times when the engine is operating, thereby minimizing heat generation and minimizing wear on the clutch.

The invention has been shown and described above with the preferred embodiments, and it is understood that many modifications, substitutions, and additions may be made which are within the intended spirit and scope of the invention. From the foregoing, it can be seen that the present invention accomplishes at least all of its stated objectives.

What is claimed is:

1. An improved automatic transmission having a housing, a clutch, and a wall in the housing adjacent the clutch, the improvement comprising:
   a hole through the wall to supply oil continuously to the clutch when the clutch is engaged and when the clutch is disengaged;
   a PTO port formed in the housing; and
   a cover removably mounted to the housing over the port, the cover having an internal ridge to direct oil to the hole.

2. The improved automatic transmission of claim 1 wherein the ridge is curved.

3. The improved automatic transmission of claim 1 wherein the ridge has a first end spaced apart from the hole and a second end adjacent the hole.

4. The improved automatic transmission of claim 1 wherein the wall is adjacent the PTO port.

5. The improved automatic transmission of claim 1 wherein the ridge is formed integrally with the cover.

6. The improved automatic transmission of claim 1 wherein the hole is adjacent the PTO opening.

7. The improved automatic transmission of claim 1 wherein the clutch has opposite sides and a perimeter edge, and the hole is adjacent the perimeter edge.

8. The improved automatic transmission of claim 1 wherein the clutch has a rotational axis and the hole extends substantially perpendicular to the axis.

9. An improved automatic transmission having a clutch with opposing clutch, plates moveable between engaged and disengaged positions, the improvement comprising:
   a housing surrounding the clutch;
   a PTO port in the housing;
   a cover mounted to the housing over the PTO port and having opposite interior and exterior sides;
   a wall adjacent the PTO port and defining an oil collection cavity;
   a hole in the wall;
   a ridge on the interior side of the cover;
   whereby the ridge directs lubricating oil from the cavity through the hole and onto the clutch plates when the plates are engaged and when the plates are disengaged.

10. The improved automatic transmission of claim 9 wherein the ridge is curved.

11. The improved automatic transmission of claim 9 wherein the ridge has a first end spaced apart from the hole and a second end adjacent the hole.

12. The improved automatic transmission of claim 9 wherein the hole is adjacent the PTO port.

13. The improved automatic transmission of claim 9 wherein the clutch has opposite sides and a perimeter edge, and the hole is adjacent the perimeter edge.

14. The improved automatic transmission of claim 9 wherein the clutch has a rotational axis and the hole extends substantially perpendicular to the axis.

15. A method of continuously lubricating a clutch in a transmission, comprising:
   directing lubricating fluid through a hole in an internal wall of a transmission casing to the clutch while the clutch is engaged and while the clutch is disengaged;
   directing fluid adjacent to PTO port of the transmission towards the hole; and
   the fluid being directed to the hole by a projection on an interior surface of a cover plate for the PTO port.

16. The method of claim 15 wherein the fluid is directed continuously through the hole toward the clutch.

17. The method of claim 15 further comprising collecting the fluid in a cavity adjacent a PTO port of the transmission prior to passage through the hole.

* * * * *